United States Patent [19]

Shu

[11] 4,441,555
[45] Apr. 10, 1984

[54] CARBONATED WATERFLOODING FOR VISCOUS OIL RECOVERY

[75] Inventor: Winston R. Shu, Dallas, Tex.

[73] Assignee: Mobil Oil Corporation, New York, N.Y.

[21] Appl. No.: 372,401

[22] Filed: Apr. 27, 1982

[51] Int. Cl.³ .............................................. E21B 43/24
[52] U.S. Cl. ..................................... 166/272; 166/273
[58] Field of Search ........................ 166/272, 273, 274

[56] References Cited

U.S. PATENT DOCUMENTS

| 2,875,831 | 3/1959 | Martin et al. ................. 166/275 X |
| 3,135,326 | 6/1964 | Santee .......................... 166/273 X |
| 3,204,694 | 9/1965 | Johnson, Jr. et al. ......... 166/273 X |
| 3,572,437 | 3/1971 | Marberry et al. ............. 166/272 |
| 4,004,636 | 1/1977 | Brown et al. .................. 166/272 |
| 4,099,568 | 7/1978 | Allen ............................. 166/272 X |

Primary Examiner—Stephen J. Novosad
Attorney, Agent, or Firm—A. J. McKillop; M. G. Gilman; J. F. Powers, Jr.

[57] ABSTRACT

Viscous oil is recovered from a subterranean, viscous oil-containing formation by injecting a slug of $CO_2$ carbonated water containing a $CO_2$ solubility promoter into the formation via an injection well, subsequently injecting a heated fluid to release the $CO_2$ from the injected carbonated water and recovering oil from the formation through a production well.

19 Claims, 1 Drawing Figure

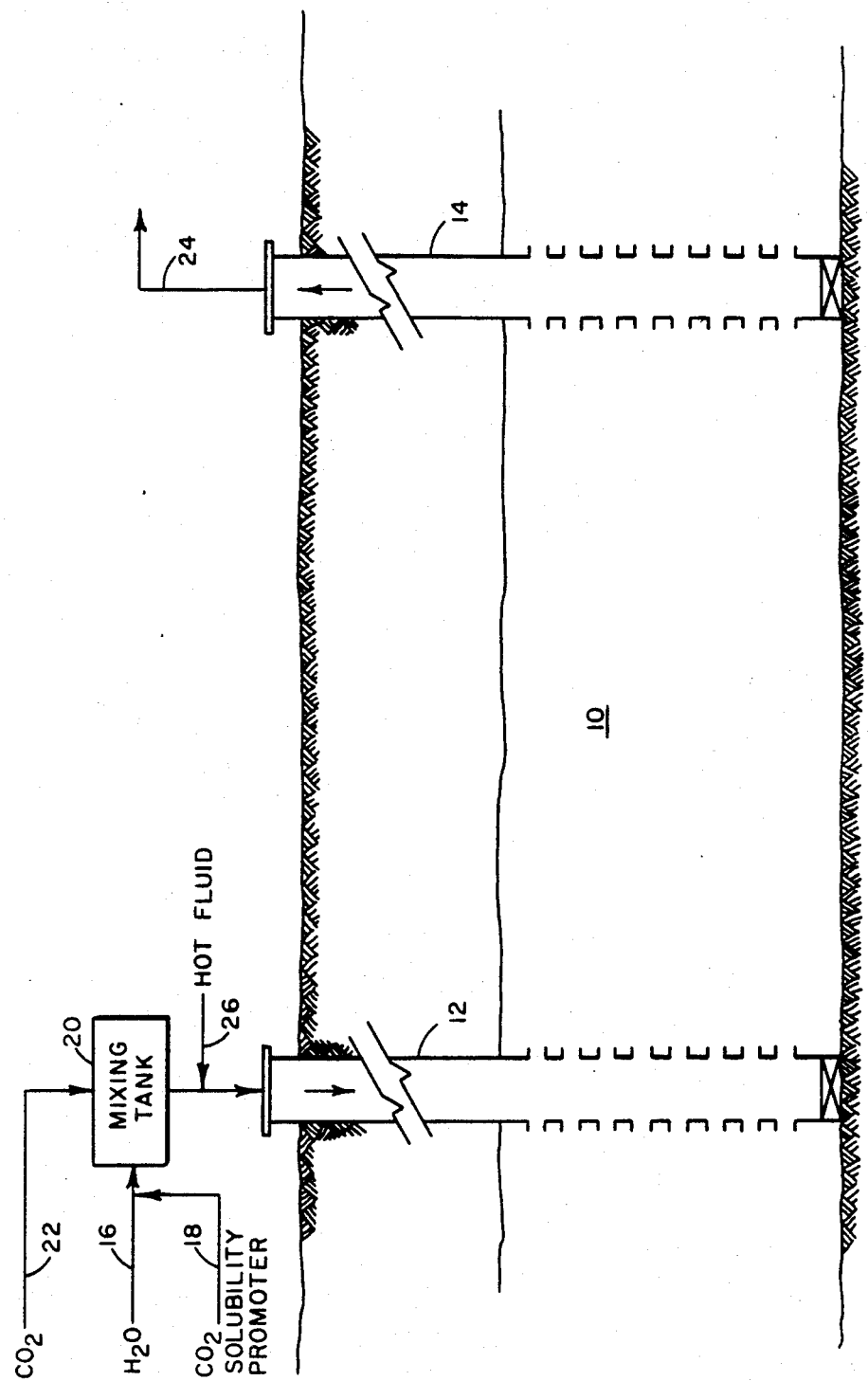

CARBONATED WATERFLOODING FOR VISCOUS OIL RECOVERY

FIELD AND BACKGROUND OF THE INVENTION

1. Field of the Invention

This invention relates to a method for recovering oil from a subterranean, viscous oil-containing formation by injecting a slug of $CO_2$ carbonated water containing a $CO_2$ solubility promoter to increase the amount of $CO_2$ injected into the formation and subsequently injecting a heated fluid to release $CO_2$ from the injected $CO_2$ carbonated water.

2. Background of the Invention

A variety of supplemental recovery techniques have been employed in order to increase the recovery of oil from subterranean formations. These techniques include thermal recovery methods, waterflooding and miscible flooding.

Fluid drive displacement of oil from an oil-containing formation utilizing $CO_2$ is known to have the following effect in enhancing the recovery of viscous oils: (1) oil swelling, (2) viscosity reduction and (3) when dissolved in an aqueous driving fluid, it dissolves part of the formation rock to increase permeability. As the oil viscosity increases, a straightforward $CO_2$ immiscible flood becomes less effective because of gravity override and viscous fingering due to unfavorable mobility ratio as disclosed in the article by T. M. Doscher et al, "High Pressure Model Study of Oil Recovery by Carbon Dioxide", SPE Paper 9787, California Regional Meeting, Mar. 25–27, 1981. In such cases, carbonated waterflood has been found to be more effective, both in the laboratory tests and through computer simulation studies as set forth in a paper by L. W. Holm, "$CO_2$ Requirements in $CO_2$ Slug and Carbonated Water Oil and Recovery Processes", *Producers Monthly*, September 1963, p. 6, and a paper by M. A. Klins et al, "Heavy Oil Production by Carbon Dioxide Injection", CIM Paper 81-32-42, 83rd Annual Meeting, Calgary, May 3–6, 1981. However, the solubility of $CO_2$ in water is quite limited and it decreases with the salinity of the water as disclosed in the aforementioned article by L. W. Holm. As a result, carbonated-water projects generally were not successful because of the insufficient transfer of $CO_2$ from water to oil.

The present invention provides a method for increasing the amount of $CO_2$ available in the formation to enhance recovery of oil by first increasing the solubility of $CO_2$ in carbonated water injected into the formation and subsequently injecting a heated fluid to release $CO_2$ from the injected carbonated water.

SUMMARY

This invention relates to a method for the recovery of viscous oil from a subterranean, viscous oil-containing formation penetrated by at least one injection well and at least one spaced-apart production well, both wells in fluid communication with a substantial portion of the formation, comprising injecting into the formation via said injection well a predetermined amount of a fluid comprising water containing a $CO_2$ solubility promoter and saturated at the injection pressure with carbon dioxide, injecting into the formation a predetermined amount of a heated fluid, and recovering fluids including oil from the formation via the production well. After the sequential slugs of $CO_2$ carbonated water containing a $CO_2$ solubility promoter and heated fluid have been injected into the formation, a water drive may be employed to displace the mobile oil toward the production well. Alternatively, after a slug of $CO_2$ carbonated water containing a $CO_2$ solubility promoter has been injected into the formation a heated fluid drive may be employed.

BRIEF DESCRIPTION OF THE DRAWING

The attached drawing depicts a subterranean, viscous oil-containing formation being subjected to the process of my invention.

DESCRIPTION OF THE PREFERRED EMBODIMENTS

Referring to the drawing, a subterranean, viscous oil-containing formation 10 is penetrated by at least one injection well 12 and at least one spaced-apart production well 14. Both the injection well 12 and the production well 14 are perforated to establish fluid communication with the viscous oil-containing formation 10.

The first step of the process comprises saturating $CO_2$ in water containing a $CO_2$ solubility promoter. Water is injected via line 16 and a $CO_2$ solubility promoter injected via line 18 into a mixing tank 20. $CO_2$ is then injected under pressure into mixing tank 20 via line 22. The absorption of $CO_2$ is well known in such aqueous solutions in accordance with the following reaction;

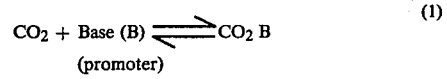

$$CO_2 + \text{Base (B)} \rightleftharpoons CO_2 \text{ B} \qquad (1)$$
$$\text{(promoter)}$$

At low temperatures, the above reaction proceeds to the right, while at higher temperatures, the reaction goes to the left. The $CO_2$ solubility promoter reacts with the $CO_2$ in the carbonated water and substantially increases its solubility, thereby making additional $CO_2$ available to be injected into the formation to enhance oil recovery.

The amount of $CO_2$ solubility promoter added to the water is within the range of 10 to 30 weight %. Suitable $CO_2$ solubility promoters include mono-ethanolamine, diethanolamine, ammonia, sodium carbonate, potassium carbonate, sodium hydroxide, potassium hydroxide, potassium phosphate, diaminoisopropanol, methyl diethanolamine, triethanolamine, or other weak base chemicals. The rate of reaction is a function of the temperature, the concentration of $CO_2$ in the water and the particular $CO_2$ solubility promoter used. Use of these types of chemicals to promote $CO_2$ solubility water is a well-known industry practice in gas absorption technology. See, for example, R. H. Perry and C. H. Chilton (editors) "Chemical Engineering Handbook", 5th edition, Section 14, McGraw-Hill (1973), the disclosure of which is hereby incorporated by reference. As an illustration, the $CO_2$ solubility in water is 38 SCF/BBL at 100° C. and 440 psia. Under identical conditions, however, a bbl of 15 weight % monoethanolamine aqueous solution will absorb 260 SCF of $CO_2$ which is more than a 7-fold increase.

The preferred temperature for absorption of $CO_2$ in such solutions is within the range of 70° to 250° F., depending upon the $CO_2$ solubility promoter used.

To obtain the maximum amount of $CO_2$ in the carbonated water, the water containing a $CO_2$ solubility promoter in tank 20 is saturated with $CO_2$ preferably at a pressure of $CO_2$ of at least 250 psi since the higher the pressure, the more $CO_2$ will go into solution. Usually, $CO_2$ saturation pressure is the pressure required to inject a fluid into the oil-containing formation which will vary from 100 to about 4000 psig depending upon formation conditions.

A slug of the $CO_2$ saturated water containing a $CO_2$ solubility promoter is injected into the formation 10 via injection well 12. The amount of carbonated water containing a $CO_2$ solubility promoter injected into the formation is dependent on the $CO_2$ solubility in the water and in the oil at reservoir conditions. The primary objective is to make available the $CO_2$ required to sufficiently reduce the oil viscosity. In practice, the injected carbonated water should not be less than 0.5 pore volume under the flood pattern. The carbonated water containing the $CO_2$ solubility promoter invades the formation and mixes with formation water thereby reducing the concentration of the $CO_2$ solubility promoter. As the slug travels away from the injection point, the fluid pressure decreases, thus causing a portion of the $CO_2$ to be released because of reduced solubility. The released $CO_2$ dissolves in the oil, reducing its viscosity and thereby enhancing oil recovery. Some formation minerals such as calcite and dolomites are dissolved by the released $CO_2$ thereby increasing formation permeability, which also enhances oil recovery.

Thereafter, a slug of heated fluid comprising steam or hot water is injected from line 26 into the formation via injection well 12 to further enhance the release of $CO_2$ into the formation 10. The amount of heated fluid injected is preferably about 0.5 to 1 pore volume. The heat carried by the hot fluid is transferred to the previously injected carbonated water thereby releasing additional $CO_2$ from the solution into the formation through the reverse of reaction (1). The temperature for optimum release of $CO_2$ is 200° to 350° F. depending upon the $CO_2$ solubility promoter used and pressure. Accordingly, the temperature of the injected steam is preferably higher than this range to compensate for heat loss to the reservoir fluids already in place.

Fluids including viscous oil reduced in viscosity by $CO_2$ dissolution are recovered from the formation via production well 14 through line 24. The produced fluids recovered from production well 14 contain essentially oil and water in which the $CO_2$ and gaseous hydrocarbons have been dissolved. Oil is separated from the produced fluids by any suitable separating means (not shown) as well as $CO_2$ which may be recycled to make additional carbonated water.

The above sequence of injection of a slug of carbonated water containing a $CO_2$ solubility promoter followed by a slug of heated fluid may be repeated for a plurality of cycles.

In another embodiment of the present invention, after the slug of $CO_2$ carbonated water containing a $CO_2$ solubility promoter has been injected into the formation, a heated driving fluid comprising steam or hot water is injected into the formation to displace the residual oil reduced in viscosity through the formation toward production well 14 from which the oil is recovered. The heated driving fluid comprising steam or hot water is injected through line 26 and into the formation via injection well 12. Fluids including oil are recovered from the formation via production well 14 through line 24. Injection of the hot driving fluid and production is continued until the amount of oil recovered is unfavorable. Injection of a slug of carbonated water prior to injection of the heated driving fluid may be repeated for a plurality of cycles.

In still another embodiment of the present invention, after the slugs of $CO_2$ carbonated water containing a $CO_2$ solubility promoter and heated fluid have been injected into the formation in that order, a driving fluid comprising unheated water is injected into the formation via the injection well 12 to displace the residual oil reduced in viscosity through the formation toward production well 14 from which it is recovered. These steps may also be repeated for a plurality of cycles.

While the invention has been described in terms of a single injection well and a single spaced apart production well, the method according to the invention may be practiced using a variety of well patterns. Any other number of wells, which may be arranged according to any pattern, may be applied in using the present method as illustrated in U.S. Pat. No. 3,927,716 to Burdyn et al. By the term "pore volume" as used herein, is meant that volume of the portion of the formation underlying the well pattern employed, as described in greater detail in the Burdyn et al. patent.

From the foregoing specification one skilled in the art can readily ascertain the essential features of this invention and without departing from the spirit and scope thereof can adapt it to various diverse applications. It is my intention and desire that my invention be limited only by those restrictions or limitation as are contained in the claims appended immediately hereinafter below.

What is claimed is:

1. A method for the recovery of viscous oil from a subterranean, viscous oil-containing formation penetrated by at least one injection well and at least one spaced-apart production well, said injection well and said production well in fluid communication with a substantial portion of the formation, comprising:
    (a) injecting into the formation via said injection well a predetermined amount of a fluid comprising water containing a base that acts as a $CO_2$ solubility promoter and saturated at the injection pressure with carbon dioxide;
    (b) injecting into the formation via said injection well a predetermined amount of a heated fluid; and
    (c) recovering fluids including oil from the formation via said production well.

2. The method of claim 1 wherein the base that acts as a $CO_2$ solubility promoter is selected from the group consisting of mono-ethanolamine, diethanolamine, ammonia, sodium carbonate, potassium carbonate, sodium hydroxide, potassium hydroxide, potassium phosphate, diaminoisopropanol, methyl diethanolamine, and triethanolamine.

3. The method of claim 1 wherein the water injected during step (a) contains 10 to 30 weight % of a base that acts as a $CO_2$ solubility promoter and is saturated with $CO_2$ at a temperature of 70° to 250° F. and a pressure of $CO_2$ of at least 250 psi.

4. The method of claim 1 wherein the heated fluid comprises steam.

5. The method of claim 4 wherein the temperature of the steam is 200° to 300° F.

6. The method of claim 1 wherein the heated fluid is hot water.

7. The method of claim 1 wherein the amount of carbonated water containing a base that acts as a $CO_2$ solubility promoter injected during step (a) is not less than 0.5 pore volume.

8. The method of claim 1 wherein the amount of heated fluid injected during step (b) is about 0.5 to 1 pore volume.

9. The method of claim 1 wherein steps (a) and (b) are repeated for a plurality of cycles.

10. The method of claim 1 including the step of injecting a driving fluid comprising unheated water into the formation via said injection well after step (b).

11. The method of claim 10 wherein steps (a), (b) and the step of injecting a driving fluid comprising unheated water are repeated for a plurality of cycles.

12. A method for the recovery of viscous oil from a subterranean, viscous oil-containing formation penetrated by at least one injection well and at least one spaced-apart production well, said injection well and said production well in fluid communication with a substantial portion of the formation, comprising:
(a) injecting into the formation via said injection well a predetermined amount of a fluid comprising water containing a base that acts as a $CO_2$ solubility promoter and saturated at the injection pressure with carbon dioxide;
(b) injecting into the formation via said injection well a heated driving fluid; and
(c) recovering fluids including oil from the formation via said production well.

13. The method of claim 12 wherein the heated driving fluid is steam.

14. The method of claim 12 wherein the water injected during step (a) contains 10 to 30 weight % of a base that acts as a $CO_2$ solubility promoter and is saturated with $CO_2$ at a temperature of 70° to 250° F. and a pressure of $CO_2$ of at least 250 psi.

15. The method of claim 12 wherein the heated driving fluid is hot water.

16. The method of claim 12 wherein the heated driving fluid is steam.

17. The method of claim 12 wherein steps (a) and (b) are repeated for a plurality of cycles.

18. The method of claim 12 wherein the amount of carbonated water containing a base that acts as a $CO_2$ solubility promoter injected during step (a) is not less than 0.5 pore volume.

19. The method of claim 12 wherein the base that acts as a $CO_2$ solubility promoter is selected from the group consisting of mono-ethanolamine, diethanolamine, ammonia, sodium carbonate, potassium carbonate, sodium hydroxide, potassium hydroxide, potassium phosphate, diaminoisopropanol, methyl diethanolamine, and triethanolamine.

* * * * *